United States Patent
Trimble et al.

(10) Patent No.: US 9,312,572 B2
(45) Date of Patent: Apr. 12, 2016

(54) SYNERGISTIC ADDITIVES FOR ELECTROCHEMICAL CELLS WITH ELECTRODEPOSITED FUEL

(71) Applicant: FLUIDIC, INC., Scottsdale, AZ (US)

(72) Inventors: Todd Trimble, Phoenix, AZ (US); Paul Johnson, Phoenix, AZ (US); Cody A. Friesen, Fort McDowell, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 39 days.

(21) Appl. No.: 14/208,809

(22) Filed: Mar. 13, 2014

(65) Prior Publication Data

US 2014/0266056 A1    Sep. 18, 2014

Related U.S. Application Data (60) Provisional application No. 61/780,322, filed on Mar. 13, 2013.

(51) Int. Cl.
| | |
|---|---|
| *H01M 6/04* | (2006.01) |
| *H01M 10/42* | (2006.01) |
| *H02J 7/00* | (2006.01) |
| *H01M 10/26* | (2006.01) |

(52) U.S. Cl.
CPC .......... *H01M 10/4235* (2013.01); *H01M 6/045* (2013.01); *H01M 10/26* (2013.01); *H02J 7/0068* (2013.01); *H01M 2300/0014* (2013.01)

(58) Field of Classification Search
None
See application file for complete search history.

(56) References Cited

U.S. PATENT DOCUMENTS

| | | | | |
|---|---|---|---|---|
| 4,029,854 | A * | 6/1977 | Walsh et al. | 429/402 |
| 4,132,837 | A | 1/1979 | Soffer | |
| 4,482,616 | A * | 11/1984 | Connolly et al. | 429/101 |
| 5,041,194 | A * | 8/1991 | Mori et al. | 205/237 |
| 5,130,211 | A | 7/1992 | Wilkinson et al. | |
| 6,027,827 | A | 2/2000 | Gan et al. | |
| 7,722,988 | B2 | 5/2010 | Webber | |
| 8,168,337 | B2 | 5/2012 | Friesen et al. | |

(Continued)

OTHER PUBLICATIONS

Winter et al., "What Are Batteries, Fuel Cells, and Supercapacitors?", Chem. Rev., vol. 104, pp. 4245-4269 (2004) abstract.

(Continued)

*Primary Examiner* — Patrick Ryan
*Assistant Examiner* — Jose Colucci Rios
(74) *Attorney, Agent, or Firm* — Pillsbury Winthrop Shaw Pittman, LLP (57) ABSTRACT

An embodiment of the invention provides for an electrochemical cell comprising: a fuel electrode comprising a metal fuel, a second electrode, an ionically conductive medium communicating the electrodes, the ionically conductive medium comprising at least two different additives, wherein at least one additive is selected from the group consisting of: macroheterocyclic compounds, phosphonium salts, hetero-ionic compounds and their derivatives; and, at least one additive is selected from the group consisting of: macroheterocyclic compounds, phosphonium salts, hetero-ionic compounds, and their derivatives. The fuel electrode and the second electrode are operable in a discharge mode wherein the metal fuel is oxidized at the fuel electrode functioning as an anode, whereby electrons are generated for conduction from the fuel electrode to the second electrode via a load. An ionically conductive medium and methods of operating an electrochemical cell are also disclosed.

38 Claims, 7 Drawing Sheets

(56) References Cited

U.S. PATENT DOCUMENTS

| | | |
|---|---|---|
| 8,309,259 B2 | 11/2012 | Friesen et al. |
| 2009/0242414 A1* | 10/2009 | Welz-Biermann et al. ... 205/162 |
| 2010/0119883 A1 | 5/2010 | Friesen et al. |
| 2010/0119895 A1 | 5/2010 | Friesen et al. |
| 2010/0266907 A1* | 10/2010 | Yazami ... 429/405 |
| 2010/0285375 A1 | 11/2010 | Friesen et al. |
| 2010/0316935 A1 | 12/2010 | Friesen et al. |
| 2011/0039181 A1 | 2/2011 | Friesen et al. |
| 2011/0059355 A1 | 3/2011 | Zhang et al. |
| 2011/0070506 A1 | 3/2011 | Friesen et al. |
| 2011/0086278 A1 | 4/2011 | Friesen et al. |
| 2011/0177428 A1* | 7/2011 | Dai et al. ... 429/498 |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0121992 A1 | 5/2012 | Friesen et al. |
| 2012/0139496 A1 | 6/2012 | Krishnan et al. |
| 2012/0202127 A1 | 8/2012 | Friesen et al. |
| 2012/0321967 A1 | 12/2012 | Wolfe et al. |
| 2012/0321969 A1 | 12/2012 | Friesen et al. |
| 2012/0321970 A1 | 12/2012 | Friesen et al. |
| 2012/0323004 A1 | 12/2012 | Friesen et al. |
| 2013/0022881 A1 | 1/2013 | Friesen et al. |
| 2013/0095393 A1 | 4/2013 | Friesen et al. |
| 2013/0230524 A1 | 4/2013 | Friesen et al. |
| 2013/0115523 A1 | 5/2013 | Friesen et al. |
| 2013/0115525 A1 | 5/2013 | Friensen et al. |
| 2013/0115526 A1 | 5/2013 | Friesen et al. |
| 2013/0115532 A1 | 5/2013 | Friesen et al. |
| 2013/0115533 A1 | 5/2013 | Friesen et al. |
| 2013/0157148 A1 | 6/2013 | Friesen et al. |

OTHER PUBLICATIONS

International Search Report/Written Opinion dated Sep. 9, 2014 of PCT/US14/25909 filed Mar. 13, 2014 (15 pages).

International Preliminary Report on Patentability dated May 12, 2015 for Appln. No. PCT/US2014/025909.

International Search Report and Written Opinion dated Sep. 9, 2014 for Appln. No. PCT/US2014/025909.

Winter et al., "What are Batteries, Fuel Cells, and Supercapacitors?" Chem. Rev, 104, 4245-4269 (2004).

Notice of Allowance dated Feb. 25, 2016 for U.S. Appl. No. 14/208,564.

\* cited by examiner

40mM 1-methyl-4-aza-1-azoniabicyclo[2,2,2]octane methylcarbonate +
2mM 1,4,7,10-tetraazacyclododecane
50mA/cm$^2$

8.0M KOH (0.275Ah/cm$^2$; 24Ah/L)

8.5M KOH (0.275Ah/cm$^2$; 24Ah/L)

FIG. 4

40mM 1-methyl-4-aza-1-azoniabicyclo[2,2,2]octane methylcarbonate
+ 2mM 1,4,7,10-tetraazacyclododecane

0.5Ah/cm$^2$, 10 Hrs (DC; 50mA/cm$^2$)

1.25Ah/cm$^2$, 25 Hrs (DC; 50mA/cm$^2$)

FIG. 5

0.5Ah/cm² ; 10hrs; 50mA/cm²

(a)
2mM 1,4,7,10 tetraazacyclododecane +
2mM tetraethylphosphonium BF4-

(b)
2mM 1,4,7,10-tetraazacyclododecane +
2mM tetraethylphosphonium BF4- +
20mM 1-methyl-4-aza-1-azoniabicyclo[2,2,2]octane methylcarbonate (c)
0.75mM 1,4,7,10-tetraazacyclododecane +
2mM tetraethylphosphonium BF4- +
20mM 1-methyl-4-aza-1-azoniabicyclo[2,2,2]octane methylcarbonate

(a)
2.0mM 1-benzyl-4-aza-1-azoniabicyclo[2,2,2]octane hydroxide +
10mM 1-methyl-4-aza-1-azoniabicyclo[2,2,2]octane methylcarbonate (b)
2.0mM 1-benzyl-4-aza-1-azoniabicyclo[2,2,2]octane hydroxide +
20mM 1-methyl-4-aza-1-azoniabicyclo[2,2,2]octane methylcarbonate (c)
2.0mM 1-benzyl-4-aza-1-azoniabicyclo[2,2,2]octane hydroxide +
0.25mM InCl₃

SYNERGISTIC ADDITIVES FOR ELECTROCHEMICAL CELLS WITH ELECTRODEPOSITED FUEL

CROSS-REFERENCE TO PRIOR APPLICATION

This application claims benefit to U.S. Provisional Patent Application Ser. No. 61/780,322, filed Mar. 13, 2013, the entire contents of which is incorporated herein in its entirety.

FIELD

The present application is related to an electrochemical cell for generating power, and more particularly a cell using electrodeposited fuel. The cell's ionically conductive medium includes at least one additive for enhancing electrodeposition and/or extending capacity.

The present application is related to an electrochemical cell for generating power, and more particularly a cell using electrodeposited fuel. The cell's ionically conductive medium includes at least one additive for enhancing electrodeposition and/or extending capacity.

All publications, patents, and patent applications cited in this Specification are hereby incorporated by reference in their entirety.

BACKGROUND

Electrochemical cells using metal as a fuel are known. Electrochemical cells using an electrolyte, a solution of solvent molecules and solute ions, as an ionically conductive medium are also known. Electrolytes maintain ionic conductivity as solvent molecules solvate solute ions due to thermodynamic interactions between those species. Electrochemical cells using metal as a fuel may be "primary" (i.e. non-rechargeable) or "secondary" (i.e. rechargeable) cells depending on desired operating characteristics and chemistries. In electrochemical cells using metal as the fuel, metal fuel is oxidized during discharge at a fuel electrode functioning as an anode. The oxidized metal fuel ions may remain in the electrolyte solution in reducible form (either as solvated ions, or combined with other ions, such as in a molecule or complex).

During charging of secondary electrochemical cells, reducible metal fuel ions are reduced to metal fuel at the interface between the electrolyte and the fuel electrode, which is now functioning as a cathode; the metal fuel thus plates the fuel electrode by this process, known as electrodeposition.

A significant problem for electrochemical cells comprising a metal fuel is the tendency for corrosion or self-discharge during idle modes (e.g. storage). This most often translates to a loss in usable capacity. In more extreme cases, self-discharge may result in outgassing and excess pressures may rupture cell seals, ultimately causing cell failure. For example, in alkaline batteries comprising zinc metal fuel, the native oxide layer is insufficient to stop the corrosion process which often results in cell performance losses.

For secondary batteries, a significant problem that arises upon charge-discharge cycling is the formation of filaments or dendrites. These formations are often nonuniform, disperse deposits which may be due to mossy or dendritic growth, and/or due to the growth of filaments, nodules, etc. Often this type of metal deposition may cause an undesirable short-circuit between the electrodes resulting in cell failure. Ideally, the electrodeposited metal accumulates as a smooth layer over the entire fuel electrode surface, thereby preserving the electrode surface morphology from one charge-discharge cycle to the next.

Another problem associated with conventional aqueous electrolyte batteries, is water electrolysis during charging. During charge, a current is passed through the battery to reduce the oxidized fuel at the fuel electrode. Some of the current, however, electrolyzes the water resulting in hydrogen evolution (i.e. reduction) at the fuel electrode and oxygen evolution (i.e. oxidation) at the oxidant electrode as represented in aqueous alkali by the following equations:

$$2H_2O(l) + 2e^- \rightarrow H_2(g) + 2OH^-(aq) \text{ and} \quad (1)$$

$$2OH^-(aq) \rightarrow \tfrac{1}{2}O_2(g) + H_2O(l) + 2e^-. \quad (2)$$

In this manner, aqueous electrolyte is lost from the battery. Additionally, the electrons that are consumed in reducing hydrogen are not available to reduce the fuel at the fuel electrode. Therefore, the parasitic electrolysis of the aqueous electrolyte reduces the round trip efficiency of the secondary (i.e. rechargeable) battery.

To mediate these problems, the electrolyte solution may comprise an additive. Electrochemical cells using an additive in the electrolyte are known. Examples of such devices are shown, for example, in U.S. Pat. Nos. 4,132,837; 5,130,211; 6,027,827; 7,722,988; and U.S. Patent Application Pub. Nos. 2010/0266907 and 2011/0059355 which are incorporated herein in their entirety. Additives for different electrochemical systems may include nitrite, lithium iodide, carbon dioxide, sulfur dioxide, crown ether, cryptands and derivatives thereof. Benefits of additive use in an electrochemical cell may, for instance, improve the electrochemical reactions by various means, for example, forming an ionically conductive layer on an electrode, decreasing wettability issues of electrodes or acting as a chelating agent. Yet, the additive may, in result, impede the function or efficiency of the electrochemical cell. For example, an electrolyte in a regenerative cell that promotes quick electroplating may concurrently promote less dense electroplating of the metal fuel on an electrode. As another example, strong adsorption of an additive may require higher overpotentials during charge, thus decreasing efficiency.

Sequestering agents are known in the art. For example, sequestering agents like glymes, crown ethers and cryptands may complex with alkali moieties and facilitate alkali metal intercalation as described in U.S. Pat. No. 5,130,211. Additionally, alkali metal-air batteries comprising crown ethers and derivatives acting as metal oxide dissolution enhancers are described in U.S. patent Ser. Nos. 12/766,224 and 12/557,452.

SUMMARY

An embodiment of the invention provides for an electrochemical cell comprising: a fuel electrode comprising a metal fuel, a second electrode, an ionically conductive medium communicating the electrodes, the ionically conductive medium comprising at least two different additives, wherein at least one additive is selected from the group consisting of: macroheterocyclic compounds, phosphonium salts, hetero-ionic compounds and their derivatives; and, at least one additive is selected from the group consisting of: macroheterocyclic compounds, phosphonium salts, hetero-ionic compounds, and their derivatives. The fuel electrode and the second electrode may be operable in a discharge mode wherein the metal fuel is oxidized at the fuel electrode functioning as an anode, whereby electrons are generated for conduction from the fuel electrode to the second electrode via a load.

In embodiment of the invention also provides for a method of discharging an electrochemical cell by oxidizing a metal fuel at a fuel electrode functioning as an anode whereby electrons are generated for conduction from the fuel electrode to a second electrode via a load, followed by disconnecting the fuel electrode and the second electrode from the load to discontinue the discharging. Furthermore, embodiments of the invention also provide for charging an electrochemical cell by applying an electrical current between a charging electrode and a fuel electrode functioning as the cathode, such that reducible metal fuel ions are reduced and electrodeposited as metal fuel in oxidizable form on the first electrode, followed by removing the electrical current to discontinue the charging.

Additionally, the invention provides for an ionically conductive medium for use in a current producing electrochemical cell comprising: at least two different additives, wherein at least one additive is selected from the group consisting of: macroheterocyclic compounds, phosphonium salts, heteroionic compounds and their derivatives; and, at least one additive is selected from the group consisting of: macroheterocyclic compounds, phosphonium salts, hetero-ionic compounds, and their derivatives.

BRIEF DESCRIPTION OF THE DRAWINGS

Embodiments of the invention are described by way of example only, with reference to the accompanying drawings in which corresponding reference symbols indicate corresponding parts, and in which.

DETAILED DESCRIPTION

The figures illustrate embodiments of various aspects of the inventions claimed. These embodiments are in no way intended to be limiting, and are intended only as an example for facilitating an understanding of the principles of the claimed inventions.

The principles of the presently described embodiments may be broadly applied to any electrochemical cell where a fuel, such as a metal fuel, is electrodeposited on the fuel electrode (i.e., the electrode with the metal fuel, which functions as the anode during discharging). Such cells may include batteries, such as metal-air batteries, for example. Non-limiting examples of electrochemical cells with which the principles of the present invention may be used are disclosed in U.S. Pat. Nos. or U.S. patent application Ser. Nos. 8,168,337; 8,309,259; 11/962,803; 12/385,217; 12/549,617; 12/631,484; 12/776,962; 12/885,268; 12/901,410; 13/019,923; 13/028,496; 13/083,929; 13/085,714; 13/096,851; 13/105,794; 13/167,930; 13/185,658; 13/220,349; 13/229,444; 13/230,549; 13/277,031; 13/299,167; 13/362,775; 13/448,923; 13/526,342; 13/526,432; 13/531,962; 13/532,374; 13/553,269; 13/566,948; 13/653,830; 13/666,864; 13/668,180; 13/668,185; 61/557,490; and 61/726,134; each of which is incorporated herein by reference.

In some embodiments, the electrochemical cell may be a secondary (i.e. rechargeable) electrochemical cell. The following exemplary description pertains to an electrochemical cell which may be operable in a charge mode upon application of an electrical current between a charging electrode and the fuel electrode. According to an embodiment of the invention, reducible metal fuel ions may be reduced and electrodeposited as metal fuel in oxidizable form on the fuel electrode functioning as a cathode. The electrodeposition technique on the fuel electrode may be used in the above identified cell or any other type of cell including embodiments where the first electrode is a single body. In some embodiments, however, the electrochemical cell may be a primary battery, and thus a charging operation (i.e. electrodeposition process) may be irrelevant. Accordingly, the description provided herein of a secondary cell is not intended to be limiting.

Figure 1:
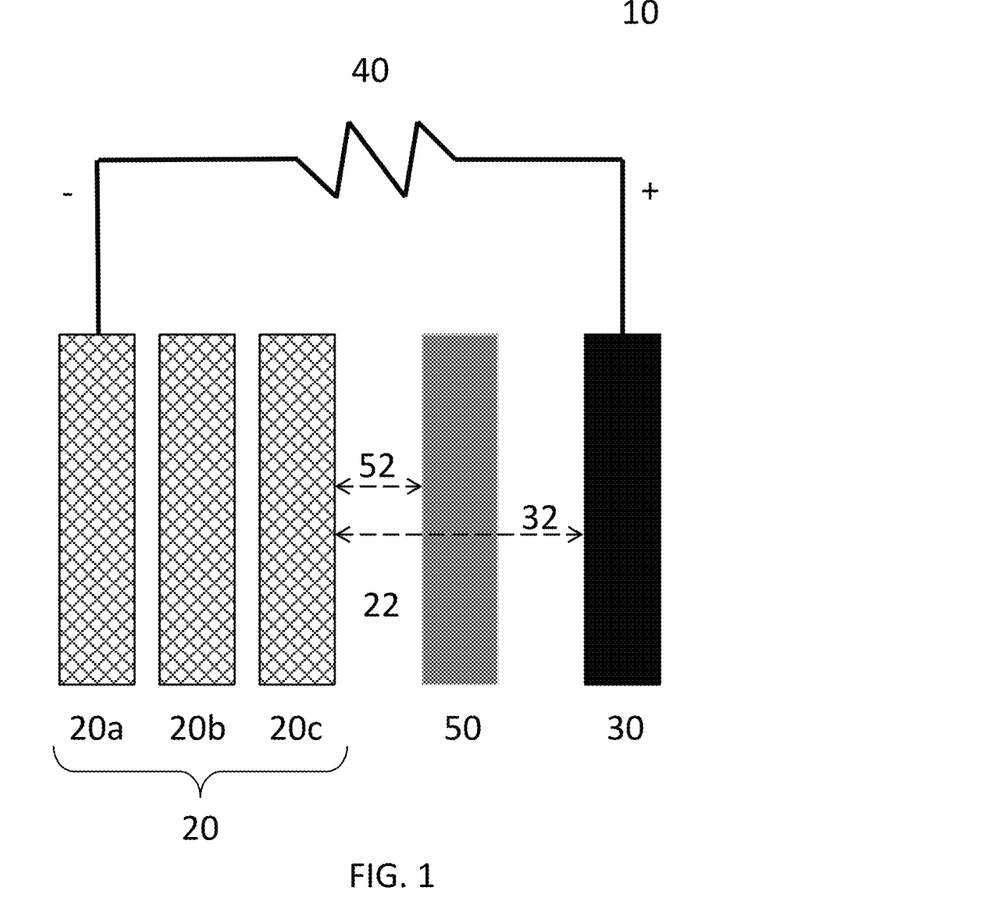
FIG. 1 is a schematic view of an electrochemical cell with a stack of permeable electrode bodies for generating electricity during discharge.

An example of an electrochemical cell 10 according to an embodiment of the present invention is illustrated in FIG. 1. The electrochemical cell 10 has a first electrode 20 and a second electrode 30. In an embodiment, the fuel of the system may be oxidized at the first electrode 20 during discharge. The first electrode 20 may comprise the fuel in the form of solid fuel electrodeposited on an electro-conductive electrode body but may be generally referred to as the first electrode 20 even when no fuel is present. At the second electrode 30, the oxidizer of the system may be reduced during discharge. The second electrode 30 for each cell 10 may be provided by smaller separate and individual second electrodes instead of a larger single "cathode" or any other suitable configuration.

As shown in FIG. 1, the first electrode 20 and the second electrode 30 can be spaced apart to define a gap 32 therebetween. The gap 32 generally can be an essentially empty gap for permitting fluid flow of an ionically conductive medium from or between the first electrode 20 to the second electrode 30. Preferably, the width of the gap 32 is essentially constant along the vertical length of the electrodes (as shown in FIG. 1) but in some configurations it may be altered. In an embodiment, the gap 32 between the first electrode 20 and the second electrode 30 may have channels or other features for facilitating flow of ionically conductive medium and oxidized fuel. In some embodiments, an ion-exchange membrane or any other suitable separator may be present.

An ionically conductive medium, generally indicated at 22, communicates with both the first electrode 20 and the second electrode 30. In some embodiments, the ionically conductive medium may flow in any suitable direction and in other embodiments, the ionically conductive medium may be essentially static. For details regarding possible flow characteristics of the ionically conductive medium 22, reference made me made to U.S. patent application Ser. Nos. 11/962,803; 12/631,484; 12/901,410; 13/019,923; 13/028,496; 13/362,775; 13/532,374; and 13/668,021, previously incorporated above. The ionically conductive medium 22 may be an electrolyte solution. Hereinafter, the ionically conductive medium 22 may be referred to as the electrolyte 22. In an embodiment, the electrolyte 22 is an aqueous solution. Examples of suitable electrolytes include aqueous solutions comprising sulfuric acid, phosphoric acid, triflic acid nitric acid, potassium hydroxide, sodium hydroxide, sodium chloride, potassium nitrate, or lithium chloride. The electrolyte may comprise a non-aqueous solvent, an ionic liquid and/or ion-exchange material such as is disclosed in U.S. patent application Ser. Nos. 12/776,962; 13/448,923; 13/526,058; 13/526,432; 13/526,342; 61/557,490 and 61/726,134; the entirety of which was previously incorporated herein by reference. Any ionically conductive medium may be used. In the non-limiting embodiment described herein, the electrolyte is an aqueous potassium hydroxide solution.

In an embodiment, the second electrode 30 comprises a porous body covered on the outer side by a gas permeable layer through which an oxidizer may diffuse but the ionically conductive medium 22 may not pass through. In some embodiments, the oxidizer may be arranged as a contained oxidizer. In other embodiments, the oxidizer may be delivered as a passive or active system to deliver oxygen from the ambient air to the second electrode 30. For further details regarding the second electrode 30 according to various embodiments, reference may be made to U.S. patent application Ser. Nos. 13/531,962; 13/668,180 and 13/668,185, previously referenced above. During discharge, when the first electrode 20 and the second electrode 30 are coupled to the external load 40, reaction among at least the oxidizer and the electrons flowing to the second electrode 30 can occur at the second electrode 30 thus reducing the oxidizer. The reduced oxidizer ions may react with the oxidized fuel ions to complete the electrochemical cell reaction.

As illustrated in FIG. 1, the first electrode 20 may comprise a plurality of electrode bodies depicted individually as electrode bodies 20a, 20b and 20c. Each body may be configured to allow the electrolyte 22 to flow through it while enabling fuel to be electrodeposited thereon during charging as described in U.S. patent application Ser. Nos. 12/885,268; 13/230,549; 13/299,167; and U.S. Pat. No. 8,309,259. It is the combination of the body or bodies and the fuel particles that comprise the first electrode 20. As depicted in FIG. 1, the first electrode 20 has a substantially rectangular configuration, however, this configuration is not intended to be limiting and any other shape or configuration is also possible.

Various materials or methods of forming the electrode bodies of the first electrode 20 may be used. For example, the body may include channels, grooves, bores, pores, mesh or any other formations able to receive electrodeposited particles of the fuel from the electrolyte 22. In an embodiment, an electrode body may include one or more screens of brass, bronze, stainless steel, nickel, monel, carbon or any other high conductivity material. It is only essential that the body may be a conductor that can act as a reduction site in electrodeposition.

During discharge as illustrated in FIG. 1, oxidation of the fuel occurs at the first electrode 20 which provides oxidized fuel ions ionically conducted by the electrolyte 22. Fuel oxidation occurs to oxidize the fuel into at least oxidized fuel ions that may remain in the electrolyte 22 and electrons for conduction by the first electrode 20 to the second electrode 30 through the external load 40.

In the simplified, non-limiting schematic of FIG. 1, the external load 40 is generally depicted as connected to the first electrode body 20a. However, it should be appreciated that numerous other connection configurations are also possible which may be based on desired operating conditions. As an example, metal fuel electrodeposits may establish an electrical connection among some or all electrode bodies 20 (e.g. as a result of a prior charge operation). Such a connection may exist between terminal electrode body 20a and subsequent permeable electrode body 20b. Additionally, electrode body 20b may be further connected to electrode body 20c via such metal fuel electrodeposits. With terminal electrode body 20a coupled to the external load 40, oxidation of the metal fuel may initiate at electrode body 20c proximal to the second electrode 30 as a result of such internal connections. In some embodiments, it may also be desirable to make an external circuit connection between electrode body 20c and the external load 40 via a switch. This external connection may be made in addition to or in absence of internal connections due to metal fuel electrodeposits based on desired operating conditions. Connections may be made selectively, programmatically, based on a sensed condition, based on an elapsed time or otherwise. For details regarding connection schemes and controls for the same, reference may be made to U.S. patent application Ser. Nos. 12/885,268; 13/083,929; 13/230,549; 13/277,031; 13/299,167; and U.S. Pat. No. 8,309,259; the entirety of which has been previously incorporated herein by reference.

The fuel may be a metal such as, for example, iron, zinc, aluminum, magnesium, or lithium. By metal, this term is meant to encompass all elements regarded as metals or semi-metals on the periodic table including but not limited to alkali metals, alkaline earth metals, lanthanides, actinides, transition metals and post-transition metals either in atomic, alloy or molecular form when collected on the electrode body and the metal fuel may take on any morphology. However, the present invention is not intended to be limited to any specific fuel and thus any other fuels may be used. To illustrate the operating principles of the invention, examples wherein zinc is the metal fuel are described herein; however this is not intended to be a limiting embodiment.

Regarding the specific reactions in one non-limiting embodiment, potassium hydroxide is used as the electrolyte 22. Zinc particles are used as the fuel, and oxygen from the ambient air is used as the oxidizer. During discharge, zinc is oxidized at the first electrode 20 producing its positive ion $Zn^{2+}$ which is supported by four hydroxide ions resulting in the zincate complex anion according to equation (3):

$$Zn + 4OH^- \rightarrow Zn(OH)_4^{2-} + 2e^-. \qquad (3)$$

During discharge, oxygen is reduced at the second electrode 30 according to equation (4):

$$O_2 + 2H_2O + 4e^- \rightarrow 4OH^-. \qquad (4)$$

In electrolyte solution 22, the following reaction occurs as represented by equation (5):

$$Zn(OH)_4^{2-} \rightarrow ZnO + H_2O + 2OH^-. \qquad (5)$$

The concentration of hydroxide ions in the electrolyte 22 may be maintained by the reduction reaction of the oxidizer at the second electrode 20 (eq. 4) and the release of the hydroxide ions from the chemical reaction of the zincate anion (eq. 5). An electrolyte 22 flow may transport the relatively unstable zincate anion away from the first electrode 20, thus preventing the zinc ion from reducing back to zinc at the first electrode 20 which in turn improves efficiency as electrons are free to flow through the external load 40 rather than being consumed by reduction of the zincate ion. In some embodiments, the zinc may remain dissolved and not precipitate to ZnO depending on various factors related to electrolyte 22 composition.

In the preferred embodiments of the invention, the metal fuel may be collected at the first electrode 20 by electrodeposition. In such an approach, the first electrode 20 body's potential is changed so that it acts as a cathode for the reduction of the fuel ions thus causing fuel cations (i.e. reducible ion species) of the metal fuel in the electrolyte to be electrodeposited on the first electrode 20 body. Thus the first electrode 20 body may be broadly characterized as being a permeable body or bodies which includes any body on which the fuel can collect.

The foregoing description of a metal fueled cell is for reference only and is not intended to be limiting. The present invention and particularly the electrodeposition technique described below may be used in a variety of different cell arrangements. The following description of an electrodeposition technique on the first electrode 20 may be used in the above identified or any other type of cell including embodiments where the first electrode is a single body.

Figure 2:
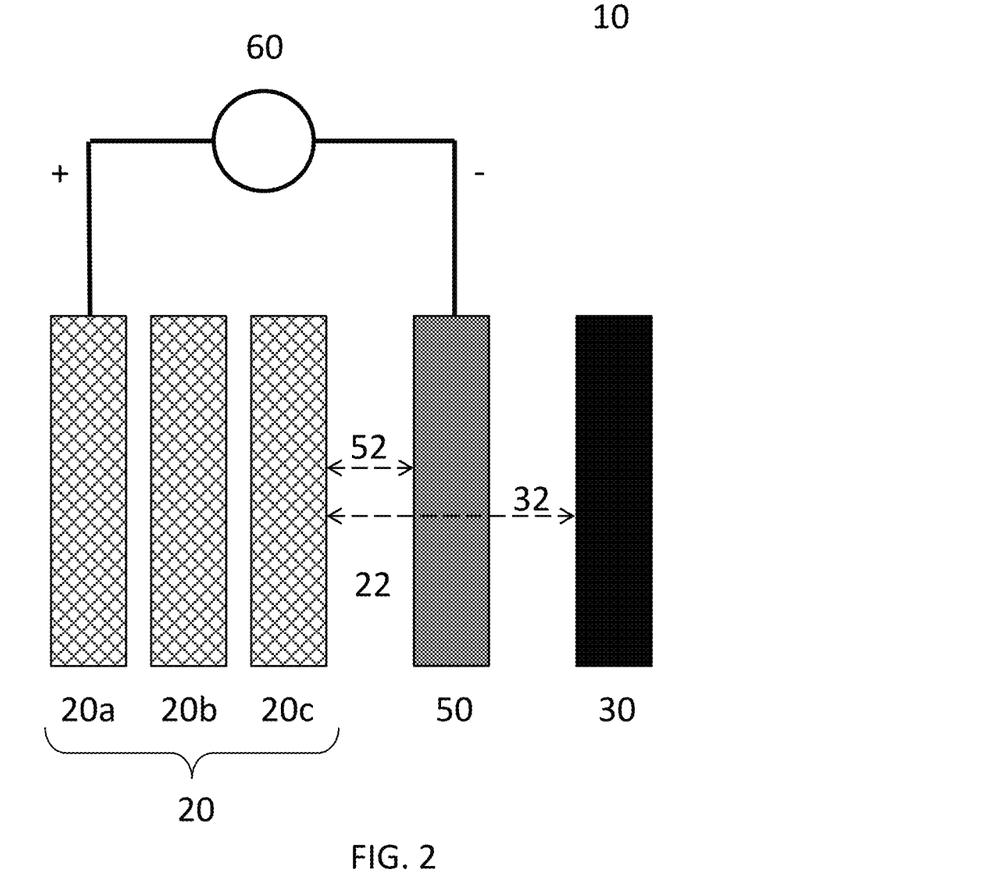
FIG. 2 is a schematic view of an electrochemical cell with a stack of permeable electrode bodies for charging with electrodeposited fuel growth thereon.

In FIG. 2, the electrochemical cell 10 is schematically depicted in somewhat exaggerated dimensions in the same manner as FIG. 1 so that the various workings can be better appreciated. This is not intended to be limiting and is merely for illustrational purposes. As can be seen in the FIG. 2, the electrochemical cell 10 also includes a charging electrode spaced apart from the first electrode 20. In the illustrated embodiment, the charging electrode is a third electrode 50 spaced apart from the first electrode 20 on the same side as the second electrode 30 such as by being within the gap 32. In some embodiments, the third electrode 50 may be arranged on the opposite side of the first electrode 20 (i.e. proximal to electrode body 20a) or any other suitable arrangement. The third electrode 50 may be spaced apart from the first electrode 20 resulting in a gap 52 which comprises the ionically conductive medium 22. In some embodiments, the second electrode 30 may be used during charging as the charging electrode and the presence of a separate electrode (e.g. third electrode 50) dedicated to charging is not necessary. The invention is not intended to be limiting and it is possible to select a second electrode 30 that is "bi-functional" meaning that it can perform both the role of an air breathing cathode during current generation and the role of an anodic charging electrode during charging. Thus, any reference herein to a charging electrode may be regarded as applying either to the second electrode 30 or a third electrode 50 that acts or functions as the anode during charging. More specifically, while the illustrated embodiment is described with reference to the charging electrode as a third electrode 50, it should be understood that the same description could be used where the second electrode 30 is the charging electrode.

Thus, as can be appreciated from the fact that in some embodiments the same physical component or parts thereof can play different electrode functions when electrodes are referred to herein, it should be understood that various structures in the same embodiments may function as one or more electrodes in different ways depending on the operational mode of the device. For example, in some embodiments where the oxidant electrode is bi-functional as a charging electrode the same electrode structure acts as an oxidant electrode during discharging and as a charging electrode during discharging. As another example, all of the bodies of the fuel electrode may act as the fuel electrode during discharging but during charging, one or more of those bodies act as the fuel electrode by receiving electrodeposited fuel and one or more other of the bodies act as the charging electrode to evolve the oxidant (e.g. oxygen gas) and the fuel electrode grows as the electrodeposited growth connects to more of the bodies. Thus, reference to an electrode is expressly defined as either a distinct electrode structure or the functional role a structure capable of multiple electrode functions may play during different operational modes of the cell and thus the same multi-functional structure may be considered to satisfy multiple electrodes for this reason.

In an embodiment, the permeable bodies of the first electrode 20 may be separated by inert non-conductive separators and/or ion-exchange membranes. As an option, the separators may also include structures in this interior region to help maintain the separation of the permeable electrode bodies without significantly impeding flow of electrolyte 22 therethrough. As another non-limiting option, separators may also include structures such as a latticed arrangement in this interior region to assist and direct the growth morphology of the metal fuel deposition.

While three electrode bodies (i.e. 20a, 20b and 20c) are depicted in the illustrated embodiment, any suitable number of electrode bodies is possible. Additionally, any suitable electrode body configuration is also possible. For example, in an embodiment, the first electrode 20 may comprise electrode bodies arranged in a symmetrical configuration, wherein a central electrode body 20a is an axis of symmetry, thus situated as the innermost electrode between electrode body 20b and an electrode body 20b' (not depicted, but generally a mirror duplicate of electrode body 20b). In such an embodiment, the configuration may further comprise any suitable number of additional first electrode bodies, second electrodes 30 and third electrodes 50.

For further details regarding the cell architecture, reference may be made to U.S. Pat. Nos. or patent application Ser. Nos. 13/019,923; 13/167,930; 13/185,658; 13/531,962; 13/532,374; 13/566,011; 13/666,948; and U.S. Pat. No. 8,309,259; the entirety of which is incorporated herein by reference above.

As depicted in the illustrative embodiment of FIG. 2, an electrical current from an external power supply 60 is applied between the third electrode 50 and first electrode 20 during a charge mode. Under this condition, the third electrode 50 functions as an anode and the terminal permeable electrode body 20a functions as a cathode. It should be appreciated that the general connection to terminal electrode body 20a in the illustrative example is only one possible configuration among numerous other connection configurations which may be selected based on desired operating characteristics. For details regarding the charging/discharging processes, switches and controls for the same, reference may be made to U.S. patent application Ser. Nos. 12/885,268; 13/083,929; 13/230,549; 13/277,031; 13/299,167; and U.S. Pat. No. 8,309,259; the entirety of which is incorporated herein by reference.

In one non-limiting example, the metal fuel is zinc and the electrolyte 22 is an aqueous solution containing potassium hydroxide which can be the same fuel and electrolyte 22 used in the above described embodiment of FIG. 1. In the electrolyte 22, the zinc ions may be provided in any suitable reducible form and preferably in the form of zinc oxide ZnO. This is advantageous as zinc oxide is the byproduct of the current generating operation described above with regard to the prior embodiment and thus the electrochemical cell 10 can be charged using the reversible byproduct of its own current generating operation. This can minimize the need to supply the fuel from a fresh source for each charging as the current generating operation has already created the reducible zinc oxide in the electrolyte 22. In such an embodiment, the reduction reaction occurs at the reduction site according to equation (6):

$$Zn(OH)_4^{2-}+2e^- \rightarrow Zn+4OH^-, \quad (6)$$

where the corresponding oxidation occurs at the third electrode 50 acting as a charging electrode in the illustrated embodiment, and functioning as an anode according to equation (7):

$$4OH^- \rightarrow O_2+2H_2O+4e^-. \quad (7)$$

In accordance with eq. (7), the charging electrode may also be referred to as an oxygen-evolving electrode. The production of oxygen gas may optionally be off-gassed in any suitable manner. For example, the management of the oxygen gas production may be facilitated as described in U.S. patent application Ser. Nos. 12/549,617; 13/532,374; 13/566,948; and 13/666,864; incorporated herein in their entirety.

The fuel need not be limited to zinc and any other metal fuel including any of those mentioned above in this application may also be used. Likewise, the electrolyte 22 may be different and may be alkaline or acidic in various embodiments. Also, it is not necessary that the reducible metal fuel ions be provided by the by-product of the current generating operation and it is within the scope of the invention to use fuels in some embodiments that create by products that are not readily reversible. Thus, it is within the scope of the invention that the electrolyte 22 used for charging be supplied from a separate fuel source with the fuel ions in a suitable form for reduction and electrodeposition which fuel source is separate from the electrolyte 22 used during current generation and which accumulates the by-product. Likewise, the same electrolyte 22 could be used in both processes but the fuel could be provided separately from its own source during the charging operation.

During the charging operation, the electrodeposition can cause or promote growth of the metal fuel in a flow permeable morphology among the permeable electrode bodies 20 such that the electrodeposited metal fuel establishes an electrical connection between the terminal permeable body 20a and each subsequent permeable electrode body (e.g. connection to electrode body 20b followed by connection to electrode body 20c). As a result of this sequential growth, the reduction and the electrodeposition occur on each subsequent permeable electrode body 20 upon the establishment of the electrical connection via metal fuel growth. In some embodiments, as growth occurs on each subsequent permeable electrode bodies 20, an external connection may also be made to the electrical circuit comprising the external power supply 60 via a switch. This connection may be made selectively, by a sensed condition, after an elapsed time, programmatically or otherwise. For details regarding sequential and progressive fuel growth methodologies, connection schemes and controls for the same, reference may be made to U.S. patent application Ser. Nos. 12/885,268; 13/083,929; 13/230,549; 13/277,031; 13/299,167; and U.S. Pat. No. 8,309,259; the entirety of which has been previously incorporated herein by reference.

In an embodiment, the growth of the electrodeposit may be controlled in such a way as to produce a generally uniform plating growth with a flow permeable morphology. By flow permeable morphology, this term means that the morphology of the metal growth among the electrode bodies 20 is configured such that the electrolyte 22 may still be able to flow through the electrode bodies 20. Thus, in some embodiments, the flow is allowed to continue and the growth does not exhibit dominant lateral characteristics that would cause complete clogging or blocking of the pores or openings of the permeable electrode bodies 20. The flow permitted may be in any direction. It is also possible to have the growth occur without any flow although flow is preferred. In a preferred embodiment, electrodeposition may be halted before lateral growth closes pores or openings of the first electrode 20 substrate. The preferred morphology of the deposit may change based on the application, cell architecture, desired operating characteristics or otherwise. As such, morphologies of the examples are not intended to be limiting, but rather the invention described herein provides a system and method to tune the morphology with the use of additives described below.

In a preferred embodiment, the growth may occur as a generally uniform plating growth. The fuel electrodeposit morphology may be controlled by the composition of additives in the ionically conductive medium 22. Properties which may be affected by the additive composition include growth density, grain size, edge effects, as well as electrodeposit plating potential and current density.

Not to be bound by any particular theory, but an additive may be selected with physico-chemical properties to strongly adsorb at an electrode surface and/or inhibit corrosion. This may be especially useful for primary batteries that conventionally suffer from high self-discharge rates. The physico-chemical properties of the additive may be chosen based on aromaticity, functional groups, electronic density, steric effects and so on. Not to be bound by any particular theory, but aromatic functional groups providing delocalized π-electrons may provide effective corrosion inhibition via interaction with d-orbitals of the metal electrode surface. As another example, hetero-ionic compounds comprising unpaired electrons associated with a nitrogen atom may provide a desirable interaction with the metal electrode surface.

It may be appreciated that an additive may be designed for incorporation into the electrodeposit at an essentially constant rate, thus facilitating partial cycling (i.e. short charge/discharge cycles). If the additive is incorporated into the electrodeposit at a gradually decreasing rate, an inhomogeneous electrodeposit will form and the effective additive concentration in the electrolyte will decrease. Under partial cycling conditions, a decreased concentration of additive may undesirably alter electrodeposit morphology and the adverse effect may be compounded with each additional partial cycle eventually resulting in shorting or other failure.

While individual compounds may be previously known the synergistic combinations disclosed and/or claimed herein function beneficially. The inventors have discovered a combined effect that is advantageous for operation of electrochemical cells comprising electrodeposited fuel.

In some embodiments, the ionically conductive medium 22 may comprise poly(ethylene glycol)tetrahydrofurfuryl (PEG-THF) and/or salts of indium, tin, lead, germanium, copper, mercury, bismuth, tartrate, phosphate, citrate, succinate, ammonium or other hydrogen evolution reaction (HER) suppressing additives as disclosed in U.S. patent application Ser. No. 13/028,496, previously incorporated by reference above. These are optional and may be omitted. In some embodiments, the ionically conductive medium 22 may comprise metal salts of differing metals than the metal fuel. For example, the ionically conductive medium 22 may comprise metal salts and/or metal oxides of indium, tin, lead, germanium, copper, mercury or other suitable metal or semi-metal.

In some embodiments, the ionically conductive medium 22 may comprise metal oxides of differing metals than the metal fuel. For example, the ionically conductive medium 22 may comprise metal salts of indium, tin, lead, germanium, copper, mercury or other suitable metal or semi-metal.

In some embodiments, the ionically conductive medium may comprise hetero-ionic compounds disclosed in U.S. patent application Ser. No. 13/526,432, previously incorporated by reference above. For example, hetero-ionic compound cations may be selected from the group of 1-methyl-4-aza-1-azoniabicyclo[2,2,2]octane, methyl-3-quinuclidinolium, their derivatives and combinations thereof. The hetero-ionic compounds are optional and may be omitted.

In an embodiment, the ionically conductive medium may comprise macroheterocyclic compounds. For example, the macroheterocyclic compound is selected from the group of:

where $X_1$-$X_6$ are heteroatoms each selected from nitrogen, oxygen, sulfur or phosphorous which may be unsubstituted or functionalized with linear or branched alkyl, linear or branched alkenyl, linear or branched alkynyl, substituted or unsubstituted aryl (e.g. homocyclic aromatics like phenyl, benzyl or heterocyclic aromatics like thienyl, pyrryl, furyl, pyridyl, imidazolyl, thiazolyl and so on), hydroxyl, carbonyl, carboxy, amine, amide, imine, phosphine, phosphine oxide, thiol sulfide, sulfoxy, halide, derivatives and combinations thereof;
m, n, o, p, q and r are each 1, 2, 3, 4, 5 or 6; each R is selected from the group consisting of hydrogen, short chain linear alkyl, and short chain branched alkyl or $R_2$ is ketyl.

In an embodiment, the heteroatom X of the macrocycle may be unsubstituted (e.g. X is equal to O, —NH—, —PH—). In some embodiments, the heteroatom X of the macrocycle may be functionalized with an electron-withdrawing group and/or a group providing steric hindrance. Not to be bound by any theory, but this may tune adsorption strength of the compound at the electrode surface which may modulate corrosion inhibition, electrodeposit morphology, improve stability or otherwise. Adsorption strength may be altered because the new groups may be electron withdrawing or because of enhanced steric hindrance. Non-limiting examples of functional groups include linear or branched alkyl, linear or branched alkenyl, linear or branched alkynyl, aryl, substituted aryl, hydroxyl, carbonyl, carboxy, amines, amide, imine, phosphine, phosphine oxide, pyridyl, thiol sulfide, sulfoxy, halide, derivatives and combinations thereof.

The macroheterocyclic compound may be used outside of the additive combinations described herein. For example, the macroheterocyclic compound may be used singularly without other additives in the ionically conductive medium, or it may be used in combination with any other additive, including but not limited to those described herein.

As non-limiting examples, the macroheterocyclic compounds are selected from the group of 12-crown-4, 15-crown-5, 18-crown-6, 1,4,7,10-tetraazacyclododecane, 1,4,7,10-tetramethyl-1,4,7,10-tetraazacyclododecane; 1,4,7,10-tetrabenzyl-1,4,7,10-tetraazacyclododecane; cis-glyoxalcyclen, their derivatives and combinations thereof.

In an embodiment, the ionically conductive medium may comprise phosphonium salts. Not to be bound by any theory, but the cations of the phosphonium salts may act to inhibit deposition of the metal fuel. Furthermore, they may promote compact morphologies via leveling and/or grain refining action. The phosphonium salt may have the following formula:

wherein $R_1$-$R_4$ are each selected from the group consisting of hydrogen, short chain ($C_1$-$C_6$) linear alkyl, and short chain branched alkyl, cyclic alkyl, alkyl amino, pyridyl, pyrrolyl, imino, pyridinyl pyrazinyl, pyrimidinyl, thienyl, thiazolyl, furyl, pyrazolyl, imidazolyl, triazolyl, tetrazolyl, and quinolinyl. The anion $A^-$ is an organic or inorganic anion or an equivalent of a multiply charged inorganic or organic anion.

As non-limiting examples, the cation of the phosphonium salt may be alkyl phosphonium (e.g. tetramethylphosphonium, tetraethylphosphonium, arylphosphonium), aminophosphonium (e.g. tris(dimethylamino)(methyl)phosphonium, phosphazenium (1-[N-(2-Methyl-2-propanyl)-P,P-di(1-pyrrolidinyl)phosphorimidoyl]pyrrolidine) compounds, derivatives and combinations thereof.

In an embodiment, the hetero-ionic aromatic additive may have a structure according to:

where A represents a charge center which may be selected from the group of: quaternary ammonium, cyclic ammonium, polycyclic ammonium, quaternary phosphonium, cyclic phosphonium, polycyclic phosphonium, phosphazine, cyclic phosphazine, polycyclic phosphazine and derivatives thereof; where R represents an organic linkage which may be selected from the group of ($C_1$-$C_{20}$) linear alkyl, branched alkyl, aryl, alkyl amino, pyridyl, pyrrolyl, imino, pyridinyl pyrazinyl, pyrimidinyl, thienyl, thiazolyl, and derivatives thereof; and, where B represents an aromatic group which may be selected from the group of benzene, azirine, diazirine, azete, pyrrole, imidazole, pyrazole, triazole, pyridine, pyrazine, diazine, triazine, azepine, diazepine, azocine, phosphole, phosphinine, oxazole, thiophene and derivatives thereof.

In an embodiment, the hetero-ionic aromatic additive structure may be designed to avoid electrochemical reductive cleavage by ensuring a base-stable linkage without β-protons. It may be appreciated that a base-stable linkage may prevent electrochemical reductive cleavage of the hetero-ionic aromatic additive. For example, benzyltrimethyl ammonium comprising β-protons may be less stable against electrochemical reductive cleavage than trimethyl-2-phenyl-2-propanaminium comprising a base-stable linkage without β-protons. In some embodiments, the linkage proximal to the aromatic group may be designed with more than one carbon to suppress resonance associated with the aromatic ring, thereby providing further stability.

According to an embodiment, the hetero-ionic aromatic additive may have a structure according to:

where A represents a charge center which may be selected from the group of: quaternary ammonium, cyclic ammonium, polycyclic ammonium, quaternary phosphonium, cyclic phosphonium, polycyclic phosphonium, phosphazine, cyclic phosphazine, polycyclic phosphazine and derivatives thereof;

where $R_1$ represents a branched linkage providing a β-carbon atom relative to charge center A which may be selected from the group of: branched alkyl, aryl, neopentyl, tert-butyl alcohol, and derivatives thereof;

where $R_2$ represents an organic linkage comprising at least two carbon atoms which may be selected from the group of ($C_1$-$C_{20}$) linear alkyl, branched alkyl, aryl, alkyl amino, pyridyl, pyrrolyl, imino, pyridinyl pyrazinyl, pyrimidinyl, thienyl, thiazolyl, and derivatives thereof; and, where B represents an aromatic group which may be selected from the group of benzene, azirine, diazirine, azete, pyrrole, imidazole, pyrazole, triazole, pyridine, pyrazine, diazine, triazine, azepine, diazepine, azocine, phosphole, phosphinine, oxazole, thiophene and derivatives thereof.

In an embodiment, the hetero-ionic aromatic additive may have a structure selected from the group of:

and derivatives thereof.

In an embodiment, an anion associated with a particular hetero-ionic aromatic cation may be chosen on the basis of solubility, chemical stability, electrochemical stability or any other suitable properties. Non-limiting examples of anions include hydroxide, methyl carbonate, tetrafluoroborate ($BF_4^-$), hexafluorophosphate ($PF_6^-$), halides, phosphates, sulfates and combinations thereof.

In an embodiment, the anion of a particular additive may be chosen on the basis of solubility, chemical stability, electrochemical stability or any other suitable properties. In regards to the morphology of the electrodeposit, the inventors have observed that the effect of the anion is less important than that of the cation.

The use of the additives disclosed herein may be beneficial over a wide range of temperatures, concentrations, and current densities. For example, the temperature range of the electrolyte 22 may be in the range of 0° C. to 80° C. The concentration of the macroheterocyclic compound in the electrolyte 22 may be in the range of 0.0001 mol/L to 0.2 mol/L. The concentration of the phosphonium salt may be in the range of 0.0005 mol/L to 0.02 mol/L. The hetero-ionic aromatic compound may be in a concentration of 0.0001 mol/L to 0.4 mol/L. The concentration of the metal salt may be in the range of 0.00001 mol/L to 0.1 mol/L. The concentration of the metal oxide may be in the range of 0.00001 mol/L to 0.1 mol/L. The current density range may be in the range at or below 110 mA/cm². In preferred embodiments, current densities may range between 5-100 mA/cm². These ranges are examples and are not intended to be limiting.

To maintain a desired or target level of the additive in the electrolyte solution, the additive modulator disclosed in U.S. patent application Ser. No. 13/220,349 may be used. The entirety of the application is incorporated herein by reference.

EXAMPLES

Non-limiting examples of general additive mixtures according to various embodiments of the invention are shown in Table 1. For comparison, the room temperature (ca. 20° C.) electrolyte 22 comprises 8M KOH and 1.25M ZnO. Zinc is electrodeposited at a current density of 50 mA/cm² (based on the projected area of the porous electrode body 20). From Table 1, the additive mixtures provide greater than 40 Ah/L capacities and 0.4 Ah/cm² areal densities for Zn electrodeposition. For a given additive composition, the typical capacity (AWL) is the characteristic amount of metal (i.e. the total charge associated with Zn electrodeposition) that can be plated with compact morphology per liter of electrolyte 22 comprising the additive mixture in a preferred embodiment. Not to be bound by any theory, but the typical capacity is determined by additive incorporation rates and/or rates associated with other mechanisms of consumption. Additionally, the typical capacity will depend on the sensitivity of electrodeposit morphology to additive surface coverage and/or concentration in electrolyte 22. The deposit densities (Ah/cm$^2$) are determined from the characteristic amount of metal (i.e. the total charge associated with Zn electrodeposition) per electrode body area. While various other mixtures are possible, the general mixtures of Table 1 are meant only to provide an exemplary comparison and are not intended to be limiting.

TABLE 1

Additive compositions according to an embodiment

| Additives | Typical capacity (Ah/L) | Areal density (Ah/cm$^2$) |
|---|---|---|
| 1-methyl-4-aza-1-azoniabicyclo[2,2,2]octane methylcarbonate + InCl3 | 120-300 | 0.4 |
| 1-methyl-4-aza-1-azoniabicyclo[2,2,2]octane methylcarbonate + tetraethylphosphonium BF4– | 90 | 0.75 |
| 1-methyl-4-aza-1-azoniabicyclo[2,2,2]octane methylcarbonate + 1,4,7,10-tetraazacyclododecane | 120 | 2 |
| 1,4,7,10-tetraazacyclododecane + tetraethylphosphonium BF4– | 100 | 0.75 |
| 1-methyl-4-aza-1-azoniabicyclo[2,2,2]octane methylcarbonate + 1,4,7,10-tetraazacyclododecane + tetraethylphosphonium BF4– | 130 | 1-2 |
| 1-methyl-4-aza-1-azoniabicyclo[2,2,2]octane methylcarbonate + 1-benzyl-4-aza-1-azoniabicyclo[2,2,2]octane hydroxide | 100 | 0.75 |
| 1-benzyl-4-aza-1-azoniabicyclo[2,2,2]octane hydroxide + InCl3 | — | 1 |
| 1-methyl-4-aza-1-azoniabicyclo[2,2,2]octane methylcarbonate + benzyltrimethylammonium OH– | 90 | 0.5 |
| 1-methyl-4-aza-1-azoniabicyclo[2,2,2]octane methylcarbonate + cis-glyoxal-cyclen | 50 | 0.5 |
| 1,4,7,10-tetraazacyclododecane + GeO2 | 80 | 0.7 |

Not to be bound by any particular theory, but the additives appear to work together synergistically since the additives alone do not produce the preferred morphology and high deposit density (Ah/cm$^2$) and capacity (Ah/L). Non-limiting synergistic effects of these additives will be shown in the following examples.

Figure 3:
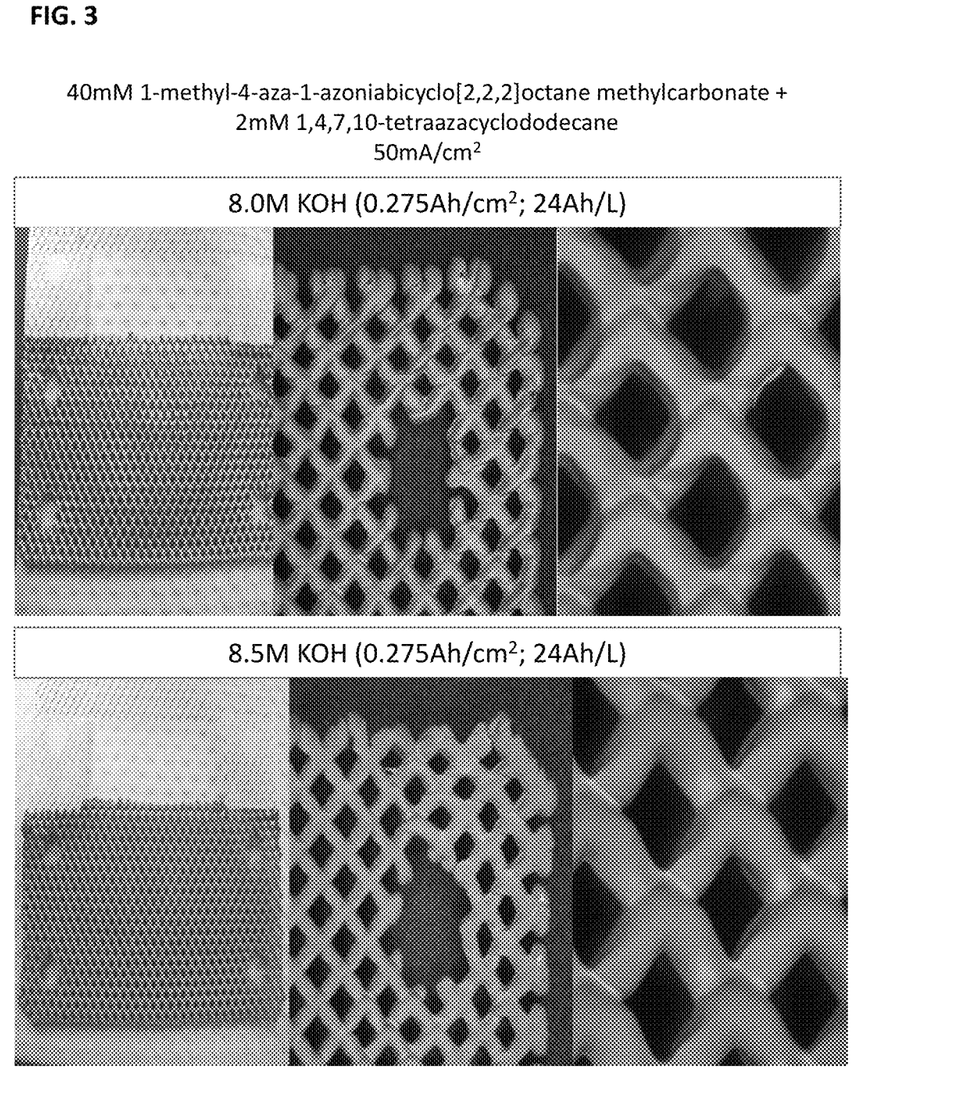
FIG. 3 shows electrodeposition at the interface between an electrolyte and an electrode in the stack of permeable electrode bodies, wherein the electrolyte comprises an additive composition of 40 mM 1-methyl-4-aza-1-azoniabicyclo[2,2,2]octane methylcarbonate and 2 mM 1,4,7,10-tetraazacyclododecane.

In an exemplary embodiment of the invention, a current density of 50 mA/cm$^2$ was applied to the first electrode 20 in an electrolyte solution of 1.25M ZnO. FIG. 3 shows electrodeposition at the interface between an electrolyte and an electrode in the stack of permeable electrode bodies, wherein the electrolyte includes an additive composition of 40 mM 1-methyl-4-aza-1-azoniabicyclo[2,2,2]octane methylcarbonate and 2 mM 1,4,7,10-tetraazacyclododecane. From the images of FIG. 3, the electrodeposit in 8.5M KOH (bottom) reveals a slightly more leveled appearance, (i.e. more effectively masking the faceted, underlying morphology of the substrate ligaments) and a generally smoother growth in comparison to the electrodeposit in 8.0M KOH (top). Both electrodeposit samples have an areal density around 0.275 Ah/cm$^2$ and a capacity of 24 Ah/L. It may be appreciated that this comparison shows the non-trivial effect of electrolyte ion concentration on electrodeposit morphology, but that a beneficial plating morphology is achieved at both concentrations.

Figure 4:
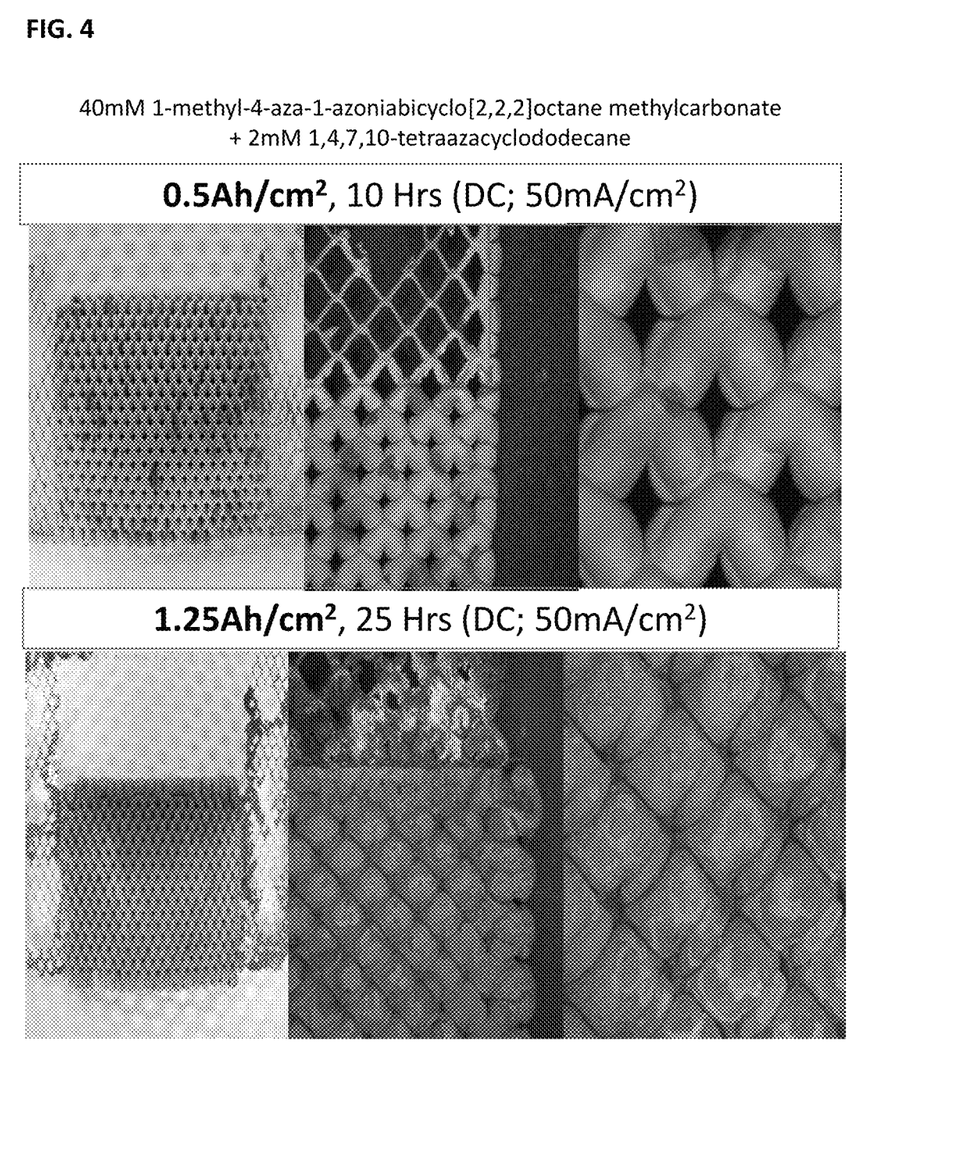
FIG. 4 shows electrodeposition at the interface between an electrolyte and an electrode in the stack of permeable electrode bodies, wherein the electrolyte comprises an additive composition of 40 mM 1-methyl-4-aza-1-azoniabicyclo[2,2,2]octane methylcarbonate and 2 mM 1,4,7,10-tetraazacyclododecane.

In an exemplary embodiment of the invention, a current density of 50 mA/cm$^2$ was applied to the first electrode 20 in an electrolyte solution of 8.0M KOH and 1.25M ZnO. FIG. 4 shows electrodeposition at the interface between an electrolyte and an electrode in the stack of permeable electrode bodies, wherein the electrolyte includes an additive composition of 40 mM 1-methyl-4-aza-1-azoniabicyclo[2,2,2]octane methyl carbonate and 2 mM 1,4,7,10-tetraazacyclododecane. In FIG. 4, the deposit after 10 hours of electrodeposition (top) has an areal density of ca. 0.5 Ah/cm$^2$. The deposit after 25 hours of electrodeposition (bottom) has an areal density of 1.25 Ah/cm$^2$. It may be appreciated that growth of the electrodeposit is controlled in such a way as to produce a generally uniform plating growth. In an embodiment, electrodeposition may be halted before lateral growth closes the pores or openings as observed in the long-term electrodeposit (FIG. 4 bottom), however the long-term electrodeposit (FIG. 4 bottom) provides an example of the morphological control with minimal dendrite formation afforded by the additives.

Figure 5:
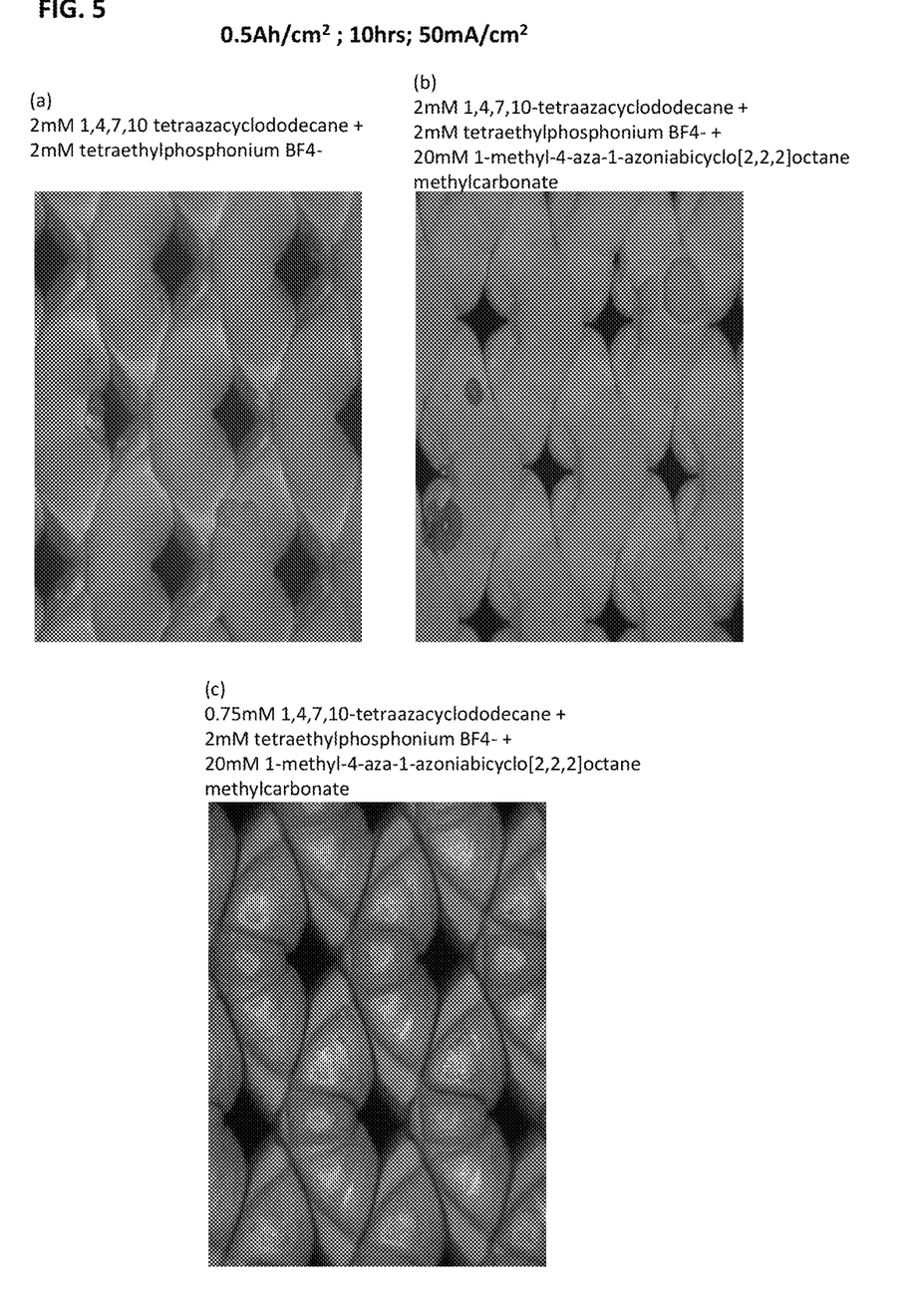
FIG. 5 shows electrodeposition at the interface between an electrolyte and an electrode in the stack of permeable electrode bodies, wherein the electrolyte comprises an additive composition of (a) 2 mM 1,4,7,10-tetraazacyclododecane and 2 mM tetraethylphosphonium tetrafluoroborate; (b) 2 mM 1,4,7,10-tetraazacyclododecane and 2 mM tetraethylphosphonium tetrafluoroborate and 20 mM 1-methyl-4-aza-1-azoniabicyclo[2,2,2]octane methylcarbonate; and (c) 0.75 mM 1,4,7,10-tetraazacyclododecane, 2 mM tetraethylphosphonium tetrafluoroborate and 20 mM 1-methyl-4-aza-1-azoniabicyclo[2,2,2]octane methylcarbonate.

In an exemplary embodiment of the invention, a current density of 50 mA/cm$^2$ was applied to the first electrode 20 in an electrolyte solution of 8.0M KOH and 1.25M ZnO. FIG. 5 shows electrodeposition at the interface between an electrolyte and an electrode in the stack of permeable electrode bodies, wherein the electrolyte includes an additive composition of (a) 2 mM 1,4,7,10-tetraazacyclododecane and 2 mM tetraethylphosphonium tetrafluoroborate; (b) 2 mM 1,4,7,10-tetraazacyclododecane, 2 mM tetraethylphosphonium tetrafluoroborate and 20 mM 1-methyl-4-aza-1-azoniabicyclo[2,2,2]octane methylcarbonate; and (c) 0.75 mM 1,4,7,10-tetraazacyclododecane, 2 mM tetraethylphosphonium tetrafluoroborate, and 20 mM 1-methyl-4-aza-1-azoniabicyclo[2,2,2]octane methylcarbonate. In FIG. 5(a), the presence of a macroheterocyclic compound and a phosphonium salt results in a smooth but still somewhat conformal electrodeposit that preserves much of the faceted appearance on the interior surfaces of the substrate ligaments that form the mesh opening. In FIG. 5(b), the presence of the same macroheterocyclic compound, the same phosphonium salt and a hetero-ionic compound results in an electrodeposit that is also desirable, but less conformal on the surfaces forming the mesh opening, as shown by the inhomogeneous, bulbous, lateral outgrowths. In FIG. 5(c), the presence of the same macroheterocyclic compound tuned to a lower concentration, the same phosphonium salt and the same hetero-ionic compound results in an electrodeposit in which the bulbous, lateral growth on the interior surfaces are absent. Much of the original substrate features are no longer visible, yet some bulbous, outward growth on the exterior surface is present. This illustrates the influence of the particular additive combinations and concentrations on the degree of conformal growth, the presence and nature of inhomogeneities, and the balance between lateral and outward growth.

Figure 6:
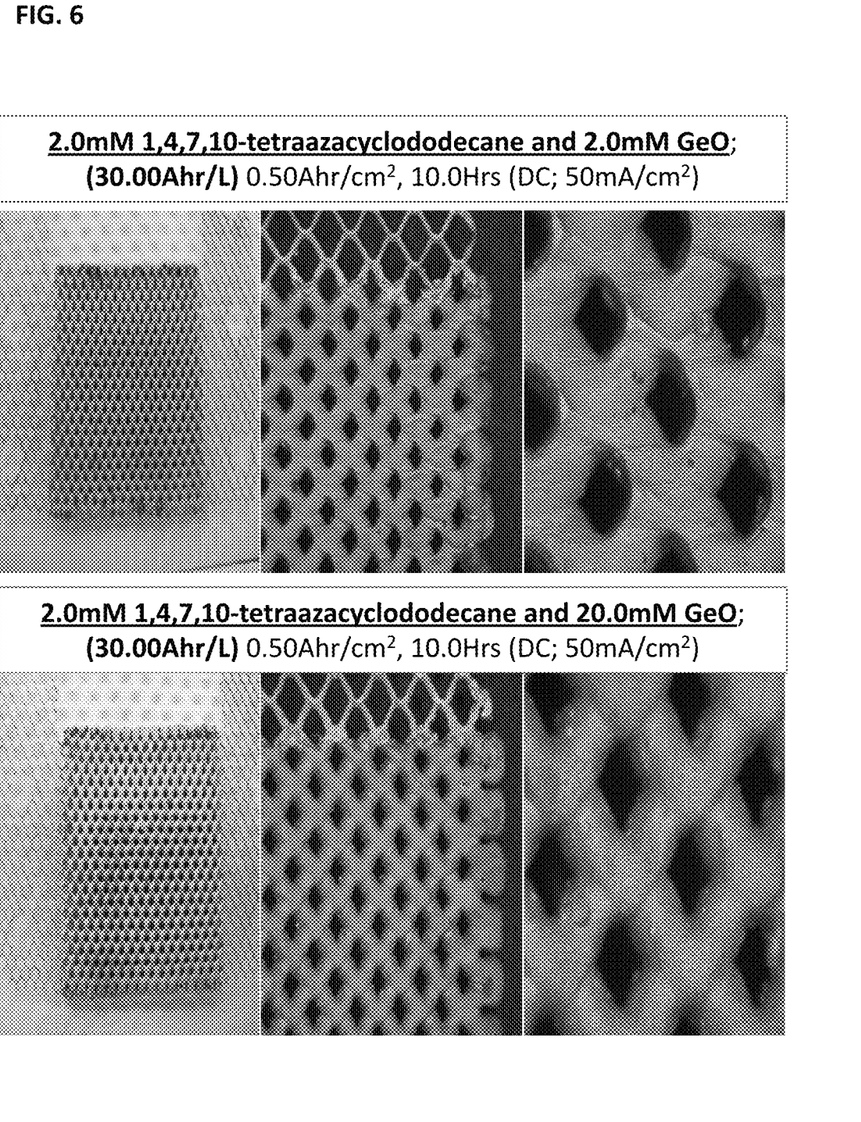
FIG. 6 shows electrodeposition at the interface between an electrolyte and an electrode in the stack of permeable electrode bodies, wherein the electrolyte comprises germanium oxide GeO in a concentration of (a) 2.0 mM; and (b) 20.0 mM.

In an exemplary embodiment of the invention, a current density of 50 mA/cm$^2$ was applied to the first electrode 20 in an electrolyte solution of 8.0M KOH and 1.25M ZnO. FIG. 6 shows electrodeposition at the interface between an electrolyte and an electrode in the stack of permeable electrode bodies, wherein the electrolyte includes 1,4,7,10-tetraazacyclododecane with germanium oxide GeO in a concentration of (a) 2.0 mM and (b) 20.0 mM. From the example of FIG. 6, a smoother, but less leveled electrodeposit, with sharper transitions between interior and exterior ligament surfaces, is observed when the ratio of macroheterocycle compound to germanium is higher.

Figure 7:
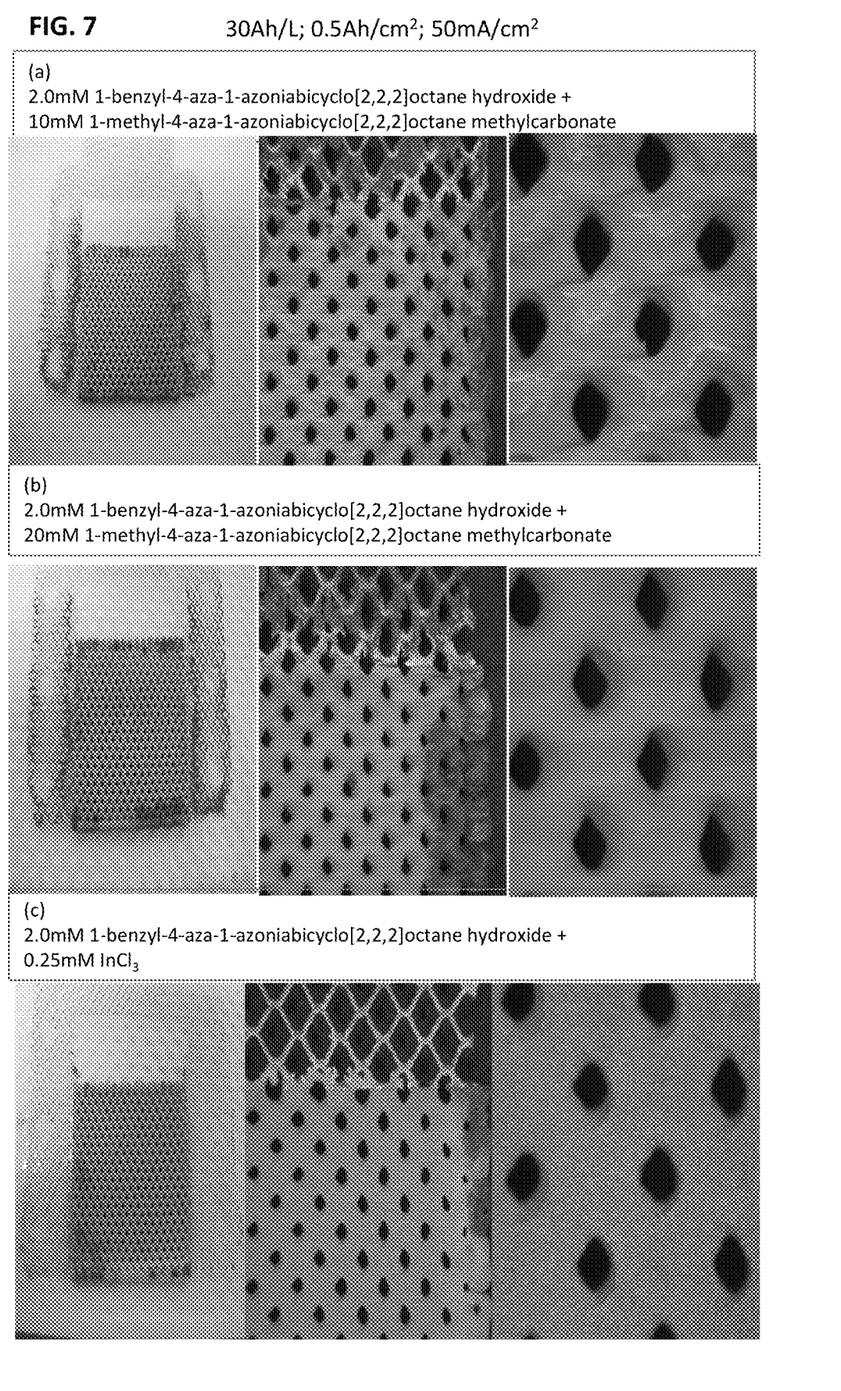
FIG. 7 shows electrodeposition at the interface between an electrolyte and an electrode in the stack of permeable electrode bodies, wherein the electrolyte comprises an additive composition of (a) 2.0 mM 1-benzyl-4-aza-1-azoniabicyclo[2,2,2]octane hydroxide and 10 mM 1-methyl-4-aza-1-azoniabicyclo[2,2,2]octane methylcarbonate; (b) 2.0 mM 1-benzyl-4-aza-1-azoniabicyclo[2,2,2]octane hydroxide and 20 mM 1-methyl-4-aza-1-azoniabicyclo[2,2,2]octane methylcarbonate; and (c) 2.0 mM 1-benzyl-4-aza-1-azoniabicyclo[2,2,2]octane hydroxide and 0.25 mM indium chloride $InCl_3$.

In an exemplary embodiment of the invention, a current density of 50 mA/cm$^2$ was applied to the first electrode 20 in an electrolyte solution of 8.0M KOH and 1.25M ZnO. FIG. 7 shows electrodeposition at the interface between an electrolyte and an electrode in the stack of permeable electrode bodies, wherein the electrolyte includes an additive composition of (a) 2.0 mM 1-benzyl-4-aza-1-azoniabicyclo[2,2,2]octane hydroxide and 10 mM 1-methyl-4-aza-1-azoniabicyclo[2,2,2]octane methylcarbonate; (b) 2.0 mM 1-benzyl-4-aza-1-azoniabicyclo[2,2,2]octane hydroxide and 20 mM 1-methyl-4-aza-1-azoniabicyclo[2,2,2]octane methylcarbonate; and (c) 2.0 mM 1-benzyl-4-aza-1-azoniabicyclo[2,2,2]octane hydroxide and 0.25 mM indium chloride InCl$_3$. In comparing the examples of FIG. 7(*a*) and FIG. 7(*b*), a smoother electrodeposit is provided when the methyl form of a preferred hetero-ionic compound is in a greater concentration relative to the benzyl form of the same hetero-ionic compound. From FIG. 7(*c*), the addition of a metal salt provides an electrodeposit of larger grain/crystallite size, with concomitant increase in microroughness. Depending on the specifics of the system, a certain morphology may be preferable and it may be appreciated that the invention provides a system and method for the precise tuning of electrodeposit morphology.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed:

1. An electrochemical cell comprising:
a fuel electrode comprising a metal fuel,
a second electrode,
an ionically conductive medium communicating the electrodes, the ionically conductive medium comprising at least two different additives, wherein at least one additive is selected from the group consisting of: macroheterocyclic compounds, phosphonium salts, hetero-ionic compounds and their derivatives; and,
at least one additive is selected from the group consisting of: macroheterocyclic compounds, phosphonium salts, hetero-ionic compounds, and their derivatives;
the fuel electrode and the second electrode being operable in a discharge mode wherein the metal fuel is oxidized at the fuel electrode functioning as an anode, whereby electrons are generated for conduction from the fuel electrode to the second electrode via a load.

2. The electrochemical cell according to claim 1 is a primary battery.

3. The electrochemical cell according to claim 1 is a secondary battery.

4. The electrochemical cell according to claim 2, further comprising a charging electrode and reducible metal fuel ions within the ionically conductive medium;
the fuel electrode and the charging electrode being operable in a charge mode wherein the reducible metal fuel ions are reduced and electrodeposited as metal fuel in oxidizable form on the fuel electrode functioning as a cathode, upon application of an electrical current between the charging electrode and the fuel electrode.

5. The electrochemical cell according to claim 2, wherein the fuel electrode comprises a plurality of spaced apart permeable bodies for receiving a metal fuel by electrodeposition, wherein said electrodeposition causes growth among the permeable electrode bodies such that the electrodeposited metal fuel establishes an electrical connection between the permeable electrode bodies.

6. The electrochemical cell according to claim 1, wherein the ionically conductive medium is an aqueous electrolyte solution.

7. The electrochemical cell according to claim 6, wherein the aqueous electrolyte solution is alkaline.

8. The electrochemical cell according to claim 7, wherein the aqueous electrolyte solution comprises potassium hydroxide.

9. The electrochemical cell according to claim 1, wherein the macroheterocyclic compound is selected from the group of:

where $X_1$-$X_6$ are heteroatoms each selected from nitrogen, oxygen, sulfur, phosphorous or nitrogen unsubstituted, or substituted with hydrogen, linear or branched alkyl, linear or branched alkenyl, linear or branched alkynyl, substituted or unsubstituted aryl, hydroxyl, carbonyl, carboxy, amine, amide, imine, phosphine, phosphine oxide, pyridyl, thiol sulfide, sulfoxy, halide, derivatives and combinations thereof;

each R is selected from the group consisting of hydrogen, short chain linear alkyl, and short chain branched alkyl or $R_2$ is ketyl.

10. The electrochemical cell according to claim 1, wherein a macroheterocyclic compound is selected from the group of 12-crown-4; 15-crown-5; 18-crown-6; 1,4,7,10-tetraazacyclododecane; 1,4,7,10-tetramethyl-1,4,7,10-tetraazacyclododecane; 1,4,7,10-tetrabenzyl-1,4,7,10-tetraazacyclododecane; cis-glyoxal-cyclen and derivatives thereof.

11. The electrochemical cell according to claim 1, wherein the phosphonium salt has a structure according to:

wherein $R_1$-$R_4$ are each selected from the group consisting of hydrogen, short chain ($C_1$-$C_6$) linear alkyl, and short chain branched alkyl, cyclic alkyl, alkyl amino, pyridyl, pyrrolyl, imino, pyridinyl pyrazinyl, pyrimidinyl, thienyl, thiazolyl, furyl, pyrazolyl, imidazolyl, triazolyl, tetrazolyl, and quinolinyl, and wherein $A^-$ is an organic or inorganic anion or an equivalent of a multiply charged inorganic or organic anion.

12. The electrochemical cell according to claim 1, wherein the phosphonium salt comprises an alkyl phosphonium cation.

13. The electrochemical cell according to claim 1, wherein the phosphonium salt comprises an aminophosphonium cation.

14. The electrochemical cell according to claim 1, wherein the cation of the phosphonium salt comprises a phosphazenium cation.

15. The electrochemical cell according to claim 1, wherein the cation of the phosphonium salt is selected from the group of tetraethylphosphonium, tris(dimethylamino)(methyl)phosphonium and derivatives thereof.

16. The electrochemical cell according to claim 1, wherein the hetero-ionic compound has a structure has a structure according to:

where A represents a charge center which may be selected from the group of: quaternary ammonium, cyclic ammonium, polycyclic ammonium, quaternary phosphonium, cyclic phosphonium, polycyclic phosphonium, phosphazine, cyclic phosphazine, polycyclic phosphazine and derivatives thereof;

where R represents an organic linkage which may be selected from the group of ($C_1$-$C_{20}$) linear alkyl, branched alkyl, aryl, alkyl amino, pyridyl, pyrrolyl, imino, pyridinyl pyrazinyl, pyrimidinyl, thienyl, thiazolyl, and derivatives thereof;

and where B represents an aromatic group which may be selected from the group of benzene, azirine, diazirine, azete, pyrrole, imidazole, pyrazole, triazole, pyridine, pyrazine, diazine, triazine, azepine, diazepine, azocine, phosphole, phosphinine, oxazole, thiophene and derivatives thereof.

17. The electrochemical cell according to claim 1, wherein the hetero-ionic compound has a structure according to:

where A represents a charge center which may be selected from the group of: quaternary ammonium, cyclic ammonium, polycyclic ammonium, quaternary phosphonium, cyclic phosphonium, polycyclic phosphonium, phosphazine, cyclic phosphazine, polycyclic phosphazine and derivatives thereof;

where $R_1$ represents branched linkage providing a β-carbon atom relative to charge center A without beta protons which may be selected from the group of: branched alkyl, aryl, neopentyl, tert-butyl alcohol, and derivatives thereof;

where $R_2$ represents an organic linkage comprising at least two carbon atoms which may be selected from the group of ($C_1$-$C_{20}$) linear alkyl, branched alkyl, aryl, alkyl amino, pyridyl, pyrrolyl, imino, pyridinyl pyrazinyl, pyrimidinyl, thienyl, thiazolyl, and derivatives thereof;

and where B represents an aromatic group which may be selected from the group of benzene, azirine, diazirine, azete, pyrrole, imidazole, pyrazole, triazole, pyridine, pyrazine, diazine, triazine, azepine, diazepine, azocine, phosphole, phosphinine, oxazole, thiophene and derivatives thereof.

18. The electrochemical cell according to claim 1, wherein the hetero-ionic compound has a structure comprising a base-stable linkage between a charge center and an aromatic group, thereby preventing reductive cleavage of the hetero-ionic compound.

19. The electrochemical cell according to claim 1, wherein the hetero-ionic compound is a hetero-ionic aromatic compound.

20. The electrochemical cell according to claim 1, wherein the hetero-ionic compound is selected from the group of:

and derivatives thereof.

21. The electrochemical cell according to claim 1, wherein the hetero-ionic compound is selected from the group of 1-methyl-4-aza-1-azoniabicyclo[2,2,2]octane, 1-imidazole-4-aza-1-azoniabicyclo[2,2,2]octane and derivatives thereof.

22. The electrochemical cell according to claim 1, wherein the macroheterocyclic compound is in a concentration of 0.0001 mol/L to 0.2 mol/L.

23. The electrochemical cell according to claim 1, wherein the phosphonium salt is in a concentration of 0.0005 mol/L to 0.02 mol/L.

24. The electrochemical cell according to claim 1, wherein the hetero-ionic compound is in a concentration of 0.0001 mol/L to 0.4 mol/L.

25. The electrochemical cell according to claim 1, wherein the metal fuel is zinc.

26. The electrochemical cell according to claim 1, wherein an additive of the at least two additives strongly adsorbs at the fuel electrode comprising the metal fuel.

27. The electrochemical cell according to claim 1, wherein an additive of the at least two additives inhibits corrosion of the metal fuel.

28. The electrochemical cell according to claim 2, wherein an additive of the at least two additives controls the morphology of the metal fuel electrodeposit.

29. The electrochemical cell according to claim 2, wherein an additive of the at least two additives minimizes preferential plating of the metal fuel electrodeposit at edges or corners.

30. The electrochemical cell according to claim 1, wherein the first electrode comprises a series of permeable bodies arranged in spaced apart relation; wherein during charging the electrochemical cell: the electrochemical current is applied between a charging electrode and at least one of the permeable electrode bodies with the charging electrode functioning as the anode and the at least one permeable electrode body functioning as the cathode, such that the reducible metal fuel ions are reduced and electrodeposited as metal fuel in oxidizable form on the at least one permeable electrode body;

said electrodeposition causing growth among the permeable electrode bodies such that the electrodeposited metal fuel establishes an electrical connection between the permeable electrode bodies.

31. The electrochemical cell according to claim 1, wherein the metal fuel is zinc and the reducible metal fuel ions are reducible zinc ions.

32. A method of operating an electrochemical cell, wherein the cell comprises:

a fuel electrode comprising a metal fuel, a second electrode, an ionically conductive medium communicating the electrodes, the ionically conductive medium comprising at least two different additives, wherein at least one additive is selected from the group consisting of: macroheterocyclic compounds, phosphonium salts, hetero-ionic compounds and their derivatives; and, at least one additive is selected from the group consisting of: macroheterocyclic compounds, phosphonium salts, hetero-ionic compounds, and their derivatives;

wherein the method comprises discharging the electrochemical cell by:

i. oxidizing the metal fuel at the fuel electrode functioning as an anode whereby electrons are generated for conduction from the fuel electrode to the second electrode via a load; and, ii. disconnecting the fuel electrode and the second electrode from the load to discontinue the discharging.

33. The method according to claim 32, wherein the electrochemical cell further comprises a charging electrode and reducible metal fuel ions within the ionically conductive medium; wherein the method further comprises charging the electrochemical cell by:

i. applying an electrical current between the charging electrode and the fuel electrode functioning as the cathode, such that reducible metal fuel ions are reduced and electrodeposited as metal fuel in oxidizable form on the fuel electrode; and, ii. removing the electrical current to discontinue the charging.

34. The method according to claim 33, wherein the fuel electrode comprises a series of permeable bodies arranged in spaced apart relation; wherein during charging the electrochemical cell: the electrochemical current is applied between a charging electrode and at least one of the permeable electrode bodies with the charging electrode functioning as the anode and the at least one permeable electrode body functioning as the cathode, such that the reducible metal fuel ions are reduced and electrodeposited as metal fuel in oxidizable form on the at least one permeable electrode body;

said electrodeposition causing growth among the permeable electrode bodies such that the electrodeposited metal fuel establishes an electrical connection between the permeable electrode bodies.

35. An electrochemical cell according to claim 1, wherein the ionically conductive medium contacts the fuel electrode.

36. An electrochemical cell according to claim 1, wherein the ionically conductive medium contacts the fuel and second electrodes.

37. A method according to claim 32, wherein the ionically conductive medium contacts the fuel electrode.

38. An electrochemical cell according to claim 32, wherein the ionically conductive medium contacts the fuel and second electrodes.

* * * * *